(12) United States Patent
Konda et al.

(10) Patent No.: US 9,753,852 B1
(45) Date of Patent: Sep. 5, 2017

(54) METHODS AND SYSTEMS FOR MANAGING ADDRESS LIST CONTROL BLOCKS

(71) Applicant: QLOGIC Corporation, Aliso Viejo, CA (US)

(72) Inventors: Dharma R. Konda, Aliso Viejo, CA (US); Paul R. Magsino, Cerritos, CA (US)

(73) Assignee: QLOGIC Corporation, Aliso Viejo, CA (US)

(*) Notice: Subject to any disclaimer, the term of this patent is extended or adjusted under 35 U.S.C. 154(b) by 63 days.

(21) Appl. No.: 14/919,508

(22) Filed: Oct. 21, 2015

(51) Int. Cl.
G06F 13/28 (2006.01)
G06F 12/0831 (2016.01)
G06F 12/0891 (2016.01)
G06F 17/30 (2006.01)
G06F 12/122 (2016.01)
G06F 12/128 (2016.01)

(52) U.S. Cl.
CPC ...... *G06F 12/0833* (2013.01); *G06F 12/0891* (2013.01); *G06F 12/122* (2013.01); *G06F 12/128* (2013.01); *G06F 17/30982* (2013.01); *G06F 2212/604* (2013.01); *G06F 2212/62* (2013.01); *G06F 2212/69* (2013.01)

(58) Field of Classification Search
CPC ...... G06F 13/28; G06F 3/061; G06F 9/45558; G06F 3/0685; G06F 2009/45583; G06F 12/0833; G06F 17/30982; G06F 2212/62
See application file for complete search history.

(56) References Cited

U.S. PATENT DOCUMENTS

| | | | | |
|---|---|---|---|---|
| 6,715,036 B1* | 3/2004 | Burton | ............... | G06F 11/1008 711/112 |
| 8,250,252 B1* | 8/2012 | Konda | ............... | G06F 13/28 710/22 |
| 2011/0197028 A1* | 8/2011 | Nikara | ............... | G06F 12/084 711/118 |

* cited by examiner

*Primary Examiner* — Hashem Farrokh
(74) *Attorney, Agent, or Firm* — Klein, O'Neill & Singh, LLP

(57) ABSTRACT

Methods and systems for a device coupled to a computing device are provided. As an example, one method includes receiving a request for processing an address list control block (ALCB) by an ALCB offload engine of an adapter coupled to a computing device; determining by the ALCB offload engine if the ALCB is located at a cache managed by a cache controller of the ALCB engine; forwarding the ALCB to an address computation module that determines an address of a memory location of the computing device, where the ALCB stores the address of the memory location in an address list; generating a direct memory access (DMA) request to retrieve the ALCB from an adapter memory, when the ALCB is not located at the cache; and storing the ALCB at the cache, after the ALCB is received in response to the DMA request.

20 Claims, 7 Drawing Sheets

| Bits | | | | | | | |
|---|---|---|---|---|---|---|---|
| 0-15 | Corresponding words from the Command IOCB ||||||||
| 16 | T V | | | T10 Mem Region | | T10 Block ID ||
| 17-31 | FW Defined |||||||
| 32 | V N R | | | Next Tx DSD CRP Mem Region | | Next Tx DSD CRP Block ||
| 33 | unused |||||| Next Tx DSD Offset |
| 34 | Current Tx DSD Address (lower) |||||||
| 35 | Current Tx DSD Address (upper) |||||||
| 36 | Current Tx DSD Length |||||||
| 37 | Tx DSD Count |||||||
| 38 | unused |||||||
| 39 | Total Tx Offset |||||||
| 40 | V N R | | | Next Rx DSD CRP Mem Region | | Next Rx DSD CRP Block ||
| 41 | unused |||||| Next Rx DSD Offset |
| 42 | Current Rx DSD Address (lower) |||||||
| 43 | Current Rx DSD Address (upper) |||||||
| 44 | Current Rx DSD Length |||||||
| 45 | Rx DSD Count |||||||
| 46 | unused |||||||
| 47 | Total Rx Offset |||||||
| 48 | unused |||||||
| 49 | unused |||||||
| 50 | unused |||||||
| 51-53 | DSD 0 |||||||
| 54-56 | DSD 1 |||||||
| 57-59 | DSD 2 |||||||
| 60-62 | DSD 3 |||||||
| 63 | V | | | Next Mem Region | | Next Block ||
| | 31 | | | 23 | | 15 | 7 | 0 |

152A
152B
152C
152D

METHODS AND SYSTEMS FOR MANAGING ADDRESS LIST CONTROL BLOCKS

TECHNICAL FIELD

The present disclosure relates to computing devices and more particularly, to a computing device interfacing with a peripheral device.

BACKGROUND

Computing systems are commonly used today. A computing system often communicates with a peripheral device, for performing certain functions, for example, an adapter for reading and writing information and providing access to storage networks and other network devices. Continuous efforts are being made to efficiently use adapter and computing device resources.

BRIEF DESCRIPTION OF THE DRAWINGS

The various aspects relating to facilitating communication between devices in a network now will be discussed in detail with an emphasis on highlighting the advantageous features. These novel and non-obvious aspects are shown in the accompanying drawings, which are for illustrative purposes only. These drawings include the following figures, in which like numerals indicate like parts:

FIG. 1C shows an example of an address list control block (ALCB) used according to one aspect of the present disclosure;

DETAILED DESCRIPTION

Figure 1A:
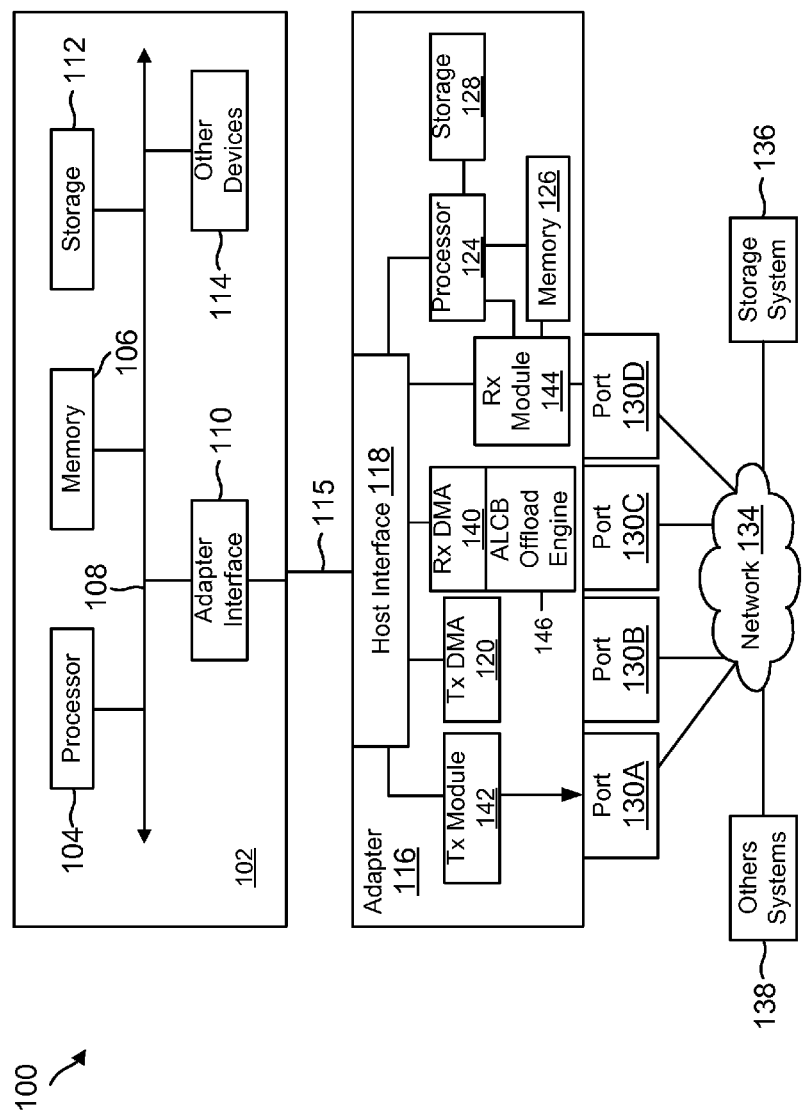
FIG. 1A is a functional block diagram of a system, used according to one aspect of the present disclosure.

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Methods and systems for an adapter coupled to a computing device are provided. As an example, one method includes receiving a request for processing an address list control block (ALCB) defined below by an ALCB offload engine of an adapter coupled to a computing device; determining by the ALCB offload engine if the ALCB is located at a cache managed by a cache controller of the ALCB engine; forwarding the ALCB to an address computation module that determines an address of a memory location of the computing device; generating a direct memory access (DMA) request to retrieve the ALCB from an adapter memory, when the ALCB is not located at the cache; and storing the ALCB at the cache, after the ALCB is received in response to the DMA request. An ALCB is a control block that stores an address list from which a device memory address can be computed, as described below in detail.

System: FIG. 1A is a block diagram of a system 100 configured for use with the various aspects of the present disclosure. The system 100 may include one or more computing device/system 102 (may also be referred to as "host system 102" or computing system 102) coupled to another device via a link 115, for example, an adapter 116 that interfaces with a network 134. The network 134 may include, for example, additional computing systems/devices 138, storage system 136 and other devices. It is noteworthy that although the description below is based on the interaction between adapter 116 and host system 102, the various aspects disclosed herein are not limited to any particular adapter type or device type.

The computing system 102 may include one or more processors/processing logic 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The processor 104 executes computer-executable process steps and interfaces with an interconnect (may also be referred to as computer bus) 108. The computer bus 108 may be, for example, a system bus, a Peripheral Component Interconnect (PCI) bus (or PCI-Express (PCIe) bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

An adapter interface 110 facilitates the ability of the computing system 102 to interface with the adapter 116 via the link 115. Link 115 may be an interconnect system, for example, a PCIe bus. The computing system 102 also includes other devices and interfaces 114, which may include a display device interface, a keyboard interface, a pointing device interface, etc. Details regarding the other devices 114 are not germane to the aspects disclosed herein.

The computing system 102 may further include a storage device 112, which may be for example a hard disk, a CD-ROM, a non-volatile memory device (flash or memory stick) or any other mass storage device. Storage 112 may store operating system program files, application program files, and other files. Some of these files are stored on storage 112 using an installation program. For example, the processor 104 may execute computer-executable process steps of an installation program so that the processor 104 can properly execute the application program.

Memory 106 also interfaces to the computer bus 108 to provide the processor 104 with access to memory storage. Memory 106 may include random access main memory (RAM). When executing stored computer-executable process steps from storage 112, the processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

With continued reference to FIG. 1A, link 115 and the adapter interface 110 couple the adapter 116 to the computing system 102. The adapter 116 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support higher data transfer rates (for example, 10G (Gigabit) or higher). The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems/devices in a storage area network (SAN) is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via adapter (also known as host bus adapters)) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a SAN. This functionality would allow Fibre Channel to leverage 10 Gigabit Ethernet networks while preserving the Fibre Channel protocol. The adapter 116 shown in FIG. 1A may be configured to operate as an FCOE adapter and may be referred to as FCOE adapter 116. The illustrated adapter 116, however, does not limit the scope of the present aspects. The present aspects may be practiced with adapters having different configurations.

Referring back to FIG. 1A, adapter 116 interfaces with the computing system 102 via the link 115 and a host interface 118. In one aspect, the host interface 118 may be a PCI Express interface having logic/circuitry (for example, a PCIe Transaction handler (PTH)) for sending and receiving PCI-Express packets.

Host interface 118 uses direct memory access (DMA) to send and receive information from processor 104 via link 115. A plurality of DMA channels as described below may be used for managing access to link 115. The DMA channels are typically used to move control structures such as input/output control blocks, input/output status blocks (IOSBs) and data between host system memory 106 and the adapter memory 126. An input/output control block (IOCB) (or IOSB) is a structure that is used for communication between host 102 processor/components and adapter 116 components.

In one aspect, a control block for sending data or status to the host processor is referred to as a RxCB, while a control block for sending data by the adapter 116 to another device is referred to as a TxCB.

The adapter 116 includes one or more processors/processing logic 124 that execute firmware instructions out of a memory 126 to control overall adapter operations. The adapter 116 may also include storage 128, which may be for example non-volatile memory, such as flash memory, or any other device. The storage 128 may store executable instructions and operating parameters that can be used for controlling overall adapter operations.

In one aspect, adapter 116 includes a transmit module 142 for transmitting packets. A transmit DMA module 120 is used to obtain data from host memory 106 and then transmitted via one of the ports 130A-130D. Ports 130A-130D include logic and circuitry to connect to network 134.

In another aspect, a receive module 144 receives data from other devices. The data may be stored at a receive buffer and then sent to the host via a DMA operation. In one aspect, adapter 116 includes a RxDMA module 140 that is used to manage access to link 115 for sending data to host memory 106. Adapter 116 also includes an ALCB offload engine 146, whose function is described below in detail.

In one aspect, a RxCB is generated by processor 124 for sending information/data packets to host memory 106. In response to the RxCB, the RxDMA module 140 transfers data packets to a PCI-Express transaction layer (PTH) located at host interface 118 from a receive buffer at the Rx module 144. The data packets are then transferred to the host memory 106. Thus, the RxDMA module 140 provides the host address and the associated data packets to the host interface 118 for transferring the data via link 115. The control information for these packets is provided by the RxCB that may also have the host memory address. In some instances, the RxCB does not have the direct host memory address information but instead has a pointer to an ALCB that typically resides at memory 126 of adapter 116. The RxDMA 140 logic has to fetch the ALCB from memory 106 and then compute the host address and program the DMA hardware to transfer the data packets. Depending on the address computation, switching contexts between control blocks that have the memory address and the ALCBs uses adapter 116 power and resources. In one aspect, the ALCB offload engine 146 is provided to offload processing the ALCBs and save power and other resources of adapter 116, as described below in detail.

Figure 1B:
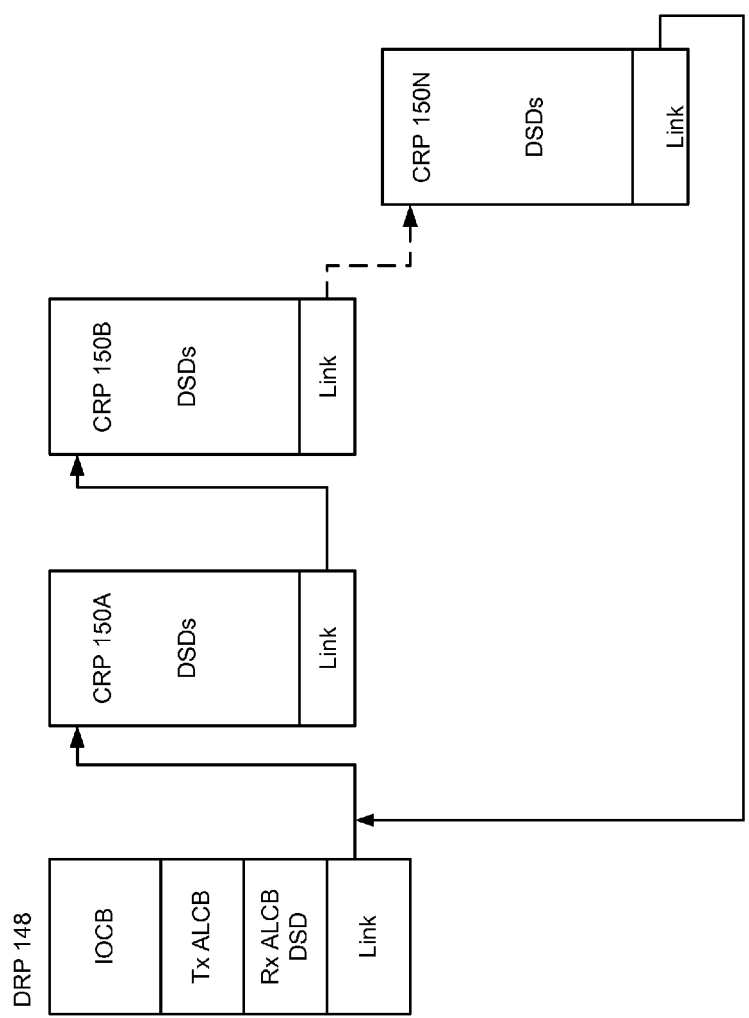
FIG. 1B shows a block diagram showing different types of control blocks used, according to one aspect of the present disclosure.

FIG. 1B shows an example of a delayed request packet (DRP) and a continuation request packet (CRP) that is used according to one aspect of the present disclosure. A DRP 148 includes a command IOCB that specifies a write, read or a status command, a transmit (Tx) ALCB, a receive (Rx) ALCB with one or more data segment descriptors (DSDs) and then a link to a next CRP 150A. A plurality of CRPs (150A-150N) include a plurality of DSDs and a link to a next CRP. As described below, a DSD includes information regarding a memory location at host memory 106. The location may be referred to as a host buffer. The DSD includes host buffer starting address and a host buffer length. The host buffer is used to place information at the host memory 106 by a DMA operation.

In one aspect, the RxDMA module 140 receives control blocks from various components, for example, one or more of processors 124. The RxCB is one such control block that is used to send data using an ALCB. The ALCB itself resides at memory 126 that may be accessed using a memory bus (not shown). The ALCB can be retrieved from memory 126 using a memory region, a block identifier (block ID) for a transfer and an offset value that specifies a number of bytes from the beginning of the address list to where the data should begin when placed. In one aspect, the ALCB offload engine 146 processes the Rx ALCB, as described below in detail. Before those details are discussed, the following provides an example of certain structures used for DRP, CRP and DSDs.

FIG. 1C shows an example of a format for DRP 152 that may be used according to one aspect of the present disclosure. Segment 152A includes a "TV" bit that may be 1 bit in size and indicates if link information for a control block (referred to as T10 block) is valid. T10 is a Technical Committee of the International Committee on Information Technology Standards (INCITS) that is accredited by, and operates under rules that are approved by, ANSI (American National Standard Institute). T10 is responsible for developing SCSI, Fibre Channel and other standards. T10 provides a format for a control block and hence the term T10 control is used in FIG. 1C. The T10 memory region specifies the memory region where the T10 control block is stored and the T10 Block ID specifies identifies the where the T10 control block is stored. The region shown as "FW Defined" is populated by the firmware of adapter 116. This region may specify the nature of an embedded command in the control block.

Segment 152B shows the various bits/fields for a Tx ALCB. The VNR bit indicates if the link information to a next CRP is valid. The Next Tx DSD CRP memory region specifies the memory region where a next CRP is stored, while the Next Tx DSD CRP block shows where a next block for the next CRP is stored.

In segment 152B, the "Next Tx DSD CRP Block Offset provides a byte offset from the base of a current DRP/CRP where a next DSD begins. The current Tx DSD lower and upper DSD address provides a host base address for a current Tx ALCB, while the current DSD length provides the provides the remaining DSD length. The Tx DSD count shows the number of DSDs that may be remaining in a transfer and the total Tx Offset provides the total number already sent for the DRP. This bit may be used for error recovery.

Segment 152C and 152D provide information regarding a Rx ALCB. Some of the fields of segments 152C and 152D are similar to the fields of segment 152B. For example, the VNR bit, Next Rx DSD CRP region, the Next Rx DSD CRP block, the Next Rx DSD offset, the current Rx DSD address, the DSD length, the Rx DSD count and the total Rx Offset. These bits have been described above with respect to the Tx ALCB and for brevity are not being described again.

Segment 152D shows various DSDs. The number of DSDs will depend on the size of the overall IOCB. The V bit is a valid bit that indicates if a next link is valid. The Next memory region of segment 152D shows where a next CRP is stored, while the next block shows the block where the next CRP is stored.

Figure 1D:
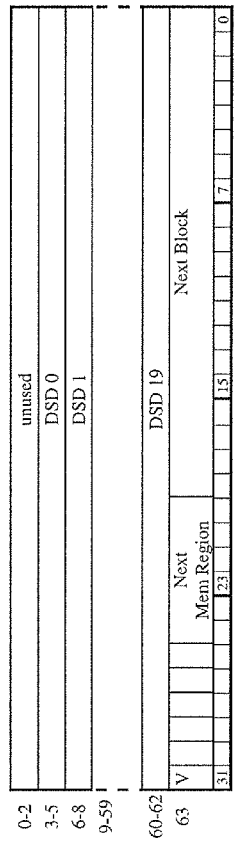
FIG. 1D shows an example of a continuation request packet (CRP), according to one aspect of the present disclosure.

FIG. 1D shows an example of a CRP 154 with a plurality of DSDs and a link to the next CRP. CRP 154 is similar to segment 152D of FIG. 1C described above.

Figure 1E:
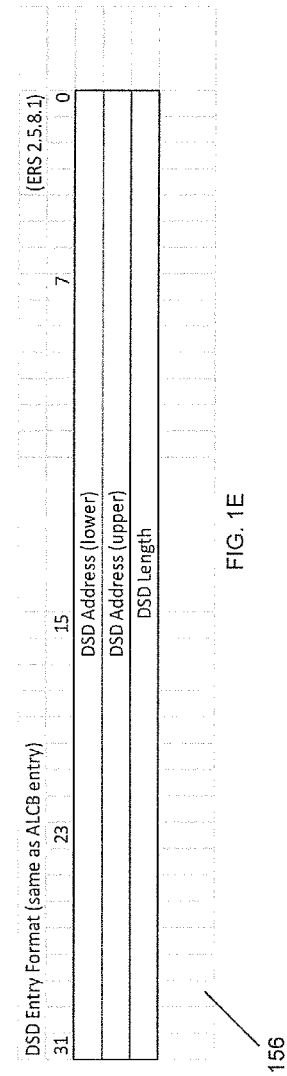
FIG. 1E shows an example of a data segment descriptor (DSD), according to one aspect of the present disclosure.

FIG. 1E shows an example of a DSD 156. The DSD includes a host buffer address (lower and upper bits) and a host buffer length (shown as DSD length).

In one aspect, one type of receive control block is to send data to the host system using an ALCB. As mentioned above, the ALCB resides at memory 126 and is retrieved using the memory region specified in the control block, the block ID for the transfer and an offset value that specifies the number of bytes from the beginning of an address list to the beginning of where the data should be placed. The request for ALCBs is processed by the ALCB offload engine 146 that is now described below in detail.

Figure 2:
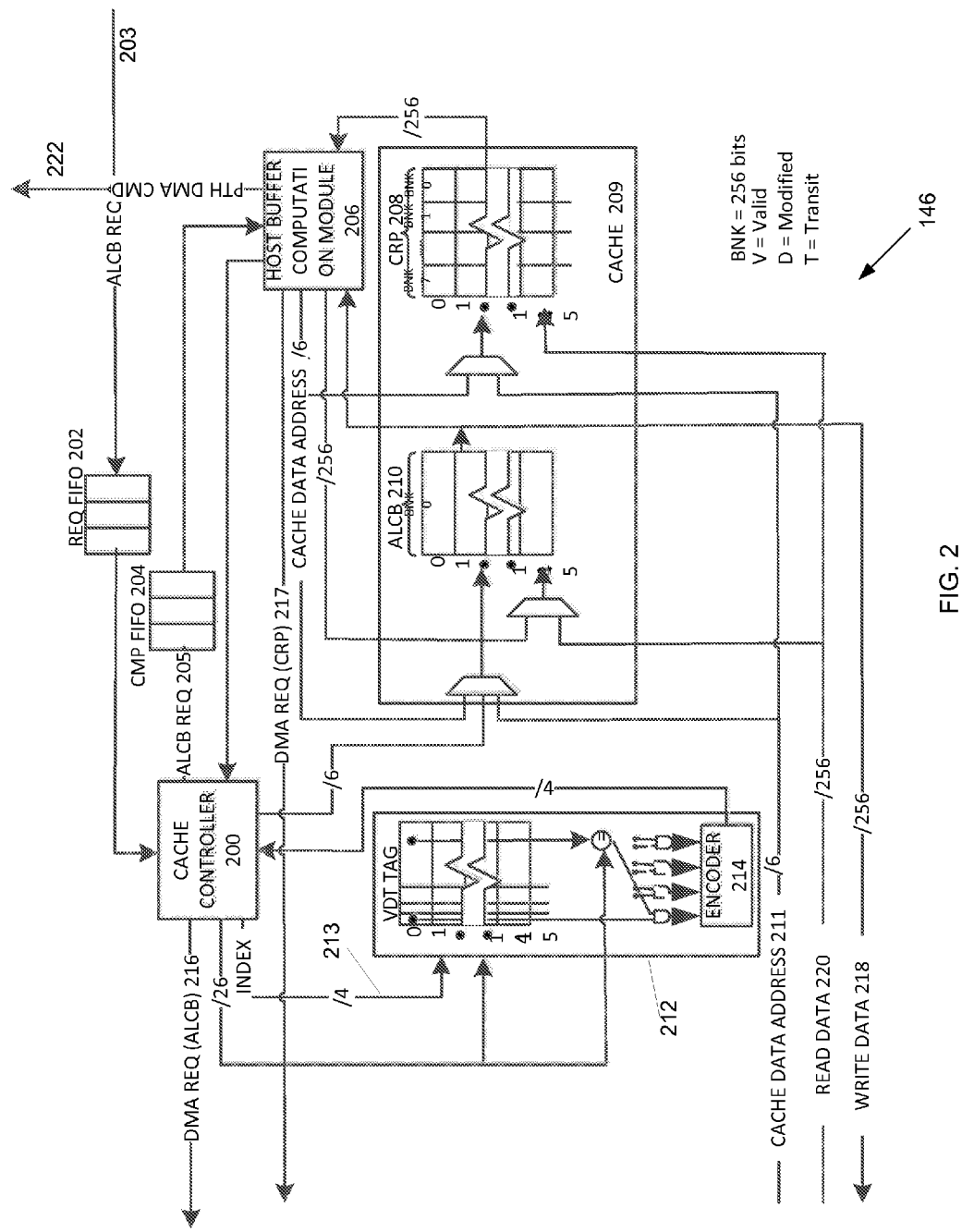
FIG. 2 shows an example of ALCB offload engine, according to one aspect of the present disclosure.

ALCB offload Engine 146:

FIG. 2 shows an example of the ALCB offload engine 146, according to one aspect of the present disclosure. The ALCB offload engine 146 receives a request 203 (RxALCB) generated by processor 124 or any other logic to process a ALCB and saves the request at a storage location, referred to as a request FIFO (first-in-first out) 202. A FIFO based memory stores information as it is received. The adaptive aspects of the present disclosure are not limited to a FIFO type memory and other memory types may be used to implement the various aspects of ALCB offload engine 146.

The request 203 includes an ALCB memory location that identifies a memory region of memory 126 from where the ALCB has to be fetched, a block identifier that identifies a block where the ALCB may be stored, an offset value and the length of the transfer. The memory location and the block identifier are used to check if the ALCB may be cached at an ALCB bank 210 of cache 209 of the offload engine 146. The ALCB bank 210 stores ALCBs and the information regarding the ALCBs is stored as tags at a ternary content addressable memory (TCAM) 212, as described below. The cache 209 also includes a CRP bank 208 for storing CRPs, as described below. It is noteworthy that the ALCB bank 210 and CRP bank 208 may be stored at separate memories. As an example, the cache banks 208 and 210 may be 256 bits in size, but any other size may be used to implement the adaptive aspects of the present disclosure.

The ALCB offload engine 146 includes a cache controller 200 that unloads the ALCB request from FIFO 202 and checks the TCAM 212 to determine if the ALCB is located at the ALCB cache bank 210. The memory region and the block ID fields (shown as index 213) from the request 203 are used to search the TCAM 212 that stores a plurality of cache tags with information regarding the ALCBs cached at the ALCB cache bank 210.

TCAM 212 includes an associative entry array, for example, a 32 entry array and encoder 214. In one aspect, a plurality of entries is compared simultaneously for determining if there is a cache hit. As an example, a tag field that is checked may be 26 bits wide and may include a "V" valid bit, a "D", dirty bit and "T" a transit bit. The valid bit indicates that the cache data entry is valid. The dirty bit indicates that the cache data entry is modified and needs to be written back to memory 126. The transit bit, T, indicates that the cache data entry is in use and cannot be written back for replacing a new ALCB entry. The transit bit is incremented when a request is pushed to completion FIFO 204 and decreased when the ALCB is updated by the host computation module 206.

When the ALCB is already cached at ALCB cache bank 210, the request (shown as 205) is moved by the cache controller 200 to the completion FIFO 204 and the status of the entry is marked as "T". If there is a miss, then the cache controller 200 sets up a memory DMA request 216 for reading the ALCB from adapter memory 126 and the request is moved to the completion FIFO 204. The cache data address 211 is received in response to the request and stored at the ALCB cache bank 210, while the data associated with the request is also retrieved from memory 126, shown as signal 220 and placed at ALCB bank 210.

If an entry is needed at the ALCB cache bank 210, then a DMA write operation 218 is setup to flush an existing entry from ALCB cache bank 210 to memory 126 so that a current/another ALCB may be written at the flushed entry. In another aspect, when the D bit is set for an entry, the entry is written to memory 126 as shown by signal 218. It is noteworthy that although DMA request 216 is only shown once, multiple instances of 216 may be used to read an ALCB from memory 126 or write data to memory 126.

Once the request 203 is completed by retrieving the ALCB either using cache 210 or a DMA operation (i.e. request 216), the ALCB is provided to a host buffer computation module 206 (may also be referred to as module 206). Module 206 generates host buffer addresses for DMA operation using DRP and CRP DSDs and a Rx control block transfer length. The DSDs are brought in the cache 209 by cache controller 200 and the CRP DSDs are handled by module 206. In one aspect, the CRPs that are fetched from memory 126 are stored at the CRP bank 208. To obtain the CRP, a DMA request 217 is generated by module 206, similar to the DMA request 216 by the cache controller 200. For request 217, the cache data address 211 is saved at the CRP bank 208 and data read from memory 126 is also placed at the CRP bank 208.

It is noteworthy that for convenience, only one signal 220 is being shown to bring data for both requests 216 and 217. The cache data address signal 211 is also shown once to bring the cache data address for requests 216 and 217. Multiple instances of signal 220 and 211 may be used to bring data and cache data address to cache 209.

If all the ALCB DSDs are consumed for a request and additional DSDs are needed for computation, then the CRP DSDs are used. The pointer to the CRP is located in the ALCB as described above and this pointer is used by module 206 to setup a read DMA operation using signals 217 and 220. The CRP is fetched and placed at the CRP cache bank 208. In one aspect, the CRP may include X number of DSDs (for example, 20). Once the DSDs are consumed a next CRP is brought in by module 206.

Every time a DSD or a partial DSD is consumed for host buffer address computation, the ALCB current DSD portion is updated with DSD consumed information. The update includes updating the total offset filed and the DSD count. A PTH (PCI-Express Transaction Handler) DMA operation is generated (shown as 222) for each host buffer computation to send data packets to the host. Details of the process for computing the host buffer addresses are described below with respect to FIG. 4.

Figure 3:
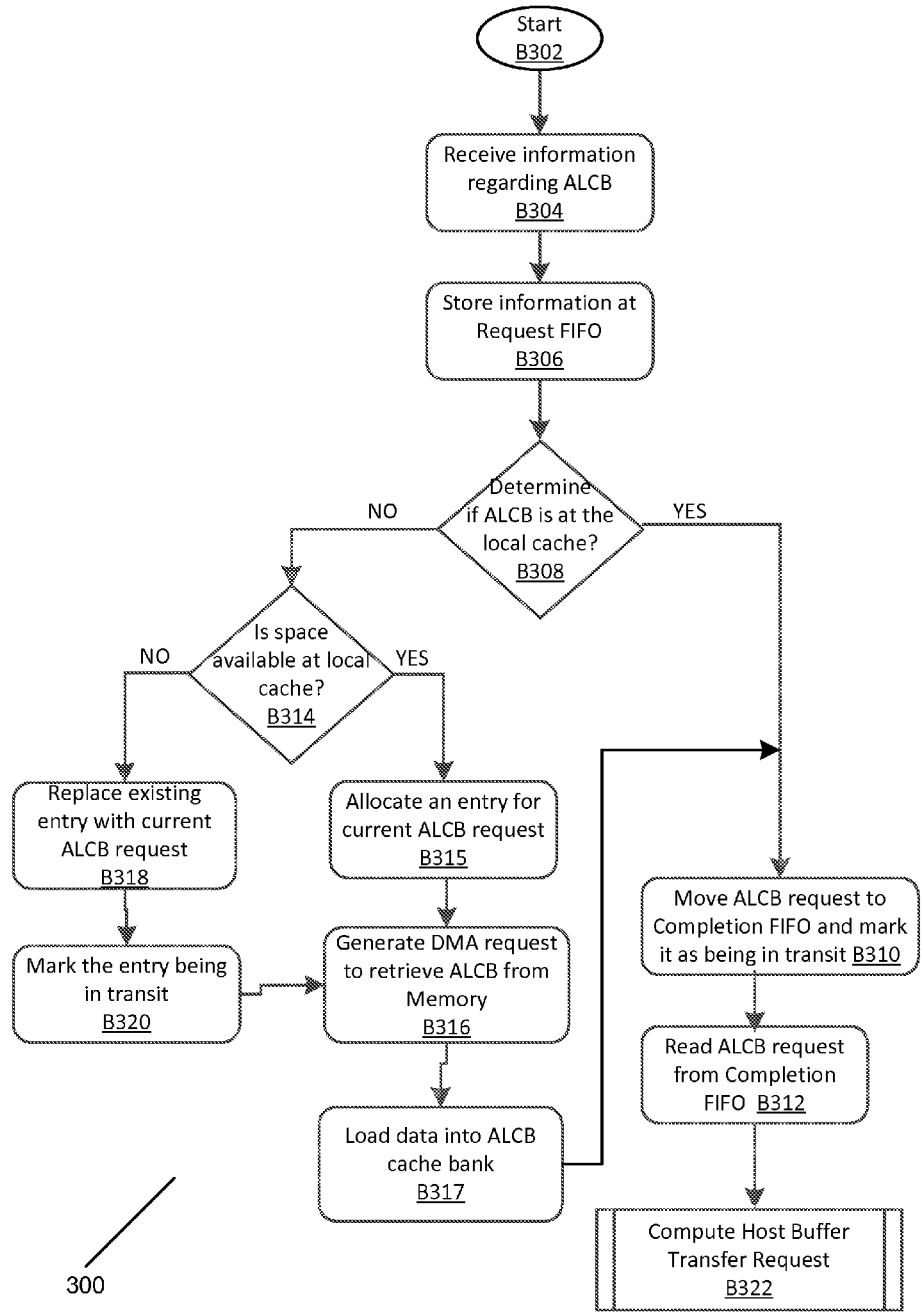
FIG. 3 shows a process for handling ALCB requests, according to one aspect of the present disclosure.

Process Flows:

FIG. 3 shows a process 300 for processing ALCB requests for retrieving ALCBs by the hardware based, ALCB offload engine 146, according to one aspect of the present disclosure. The process begins in block B302, when adapter 116 and the host system 102 are initialized and operational.

In block B304, the cache controller 200 of the offload engine 148 receives information regarding a Rx ALCB request 203. The Rx ALCB request may be from a processor or any other component of adapter 116. As described above, the request identifies an adapter memory region, a block ID and an offset value. In block B306, the Rx ALCB request is stored at FIFO 202.

In block B308, the cache controller 200 determines if the ALCB associated with the request 203 is at cache 210. The cache controller 200 uses the memory region and the block ID from the request 203 to search for ALCB tags at TCAM 212. If there is a cache hit indicating that the ALCB is at the ALCB cache bank 210, then in block B310, the ALCB request is moved to the completion FIFO 204 and the request is marked as being in transit at the cache data index of TCAM 212. The ALCB is then read in block B312 and then process moves to block B322, when the host buffer computation module 206 computes the host buffer transfer request using the ALCB, described below with respect to FIG. 4.

If the ALCB is not at cached at ALCB cache 210, then in block B314, the cache controller 200 determines if there is any space available at ALCB cache bank 210. If space is available, then in block B215, an entry is allocated for request 203. Thereafter, a DMA request (216) is generated by the cache controller 200 in block B316 to obtain the requested ALCB from memory 126. The data obtained from memory 126 (i.e. using signals 211 and 220, FIG. 2) is then stored at the ALCB cache bank 210. The process then moves to block B310 that has been described above.

If there is no space for a new ALCB, then in block B318, an entry is removed from ALCB cache bank 210. In one aspect, a least recently used entry is removed. The new location is marked as being in transit in block B320. Thereafter, the process moves to block B316, when a DMA request is generated to retrieve the ALCB from the memory 126.

Figure 4:
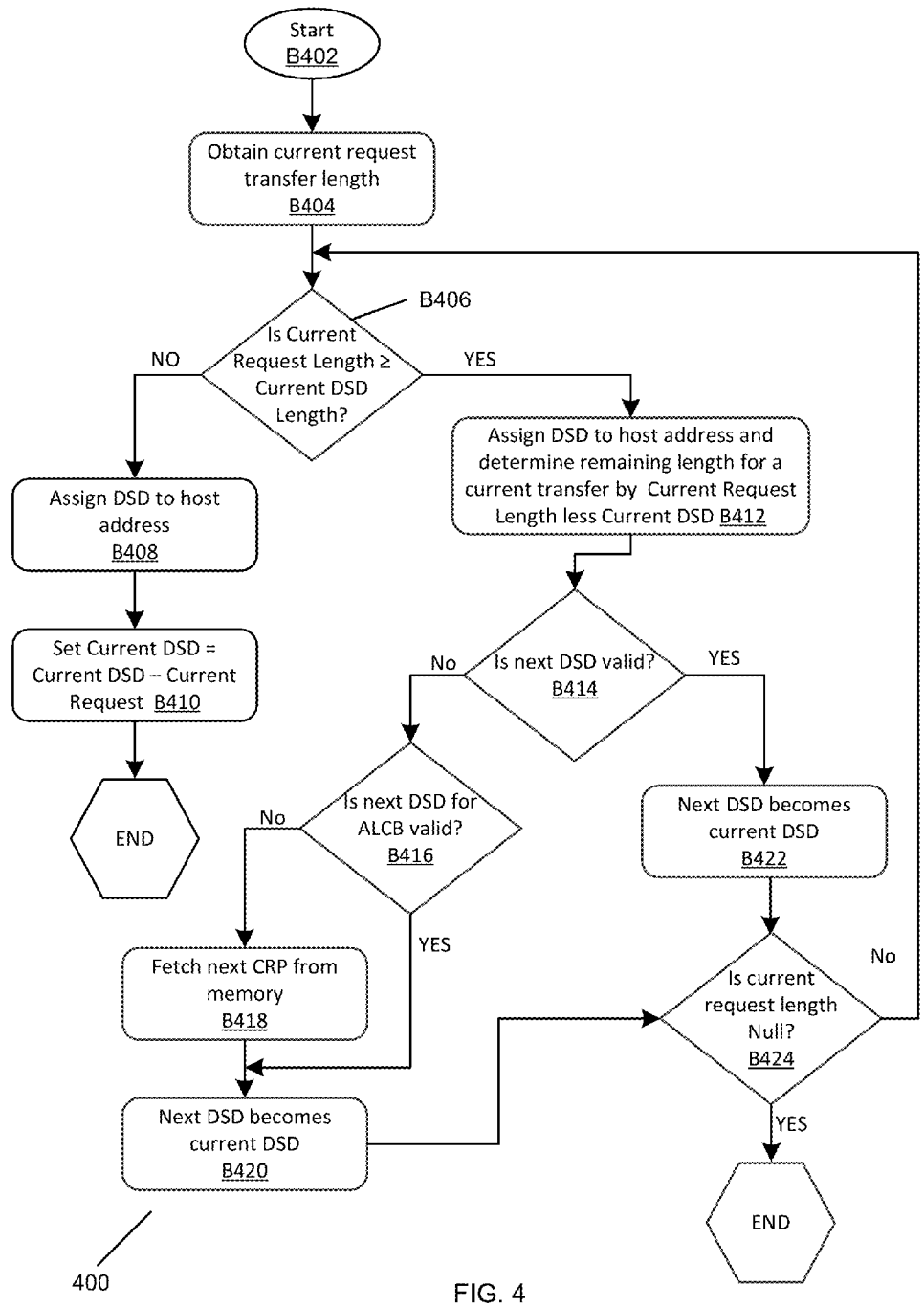
FIG. 4 shows a process for computing a host buffer address, according to one aspect of the present disclosure.

FIG. 4 shows the process 400 for host buffer address computation, according to one aspect of the present disclosure. The process begins in block B402, which is the beginning of block B322, mentioned above with respect to FIG. 3.

In block B406, the host computation module 206 obtains the current Rx ALCB request length. The current request length is compared with the current DSD length to determine if the request length is greater than the DSD length. If the request length is not greater than DSD length, then in block B408, the DSD is assigned to the host address. In block B410, the current DSD is then set to Current DSD-Current Request. Thereafter, the process ends.

If the current request length is greater, then in block B412, the DSD is assigned to the host address and the host computation module 206 determines the remaining length for the current transfer by subtracting the current DSD from the current request length.

In block B414, the host computation module 206 determines if a next DSD is valid. If not, then in block B416, the host buffer computation module 206 determines if the next DSD for the Rx ALCB is valid. If not, then a next CRP is retrieved in block B418 using the DMA request 217 (FIG. 2). If yes, then in block B420, the next DSD becomes a current DSD and the process moves to block B424, described below.

If the next DSD is valid (block B414), then in block B422, the next DSD becomes a current DSD. In block B424, the process determines if a current request is "Null". If yes, then module 206 generates an error, otherwise, the process reverts back to block B406, described above.

The following pseudo code may be used for implementing the process of FIGS. 3 and 4, described above in detail. The term "MIM" used below means a memory interface module where the ALCb is stored. MIM is interchanable with memory 126.

processing of receive side ALCBs. This allows the RX DMA logic 140 to efficiently manage requests from one or more processing logic of adapter 116.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A machine implemented method, comprising:

```
while (Current.Request.Length) {
  if (Current.Request.Length >= DRP.Current.DSD.Length){
    // Generate Host Buffer Request
    HostBuffer.Address    = DRP.Current.DSD.Address;
    HostBuffer.Length     = DRP.Current.DSD.Length;
    HostBuffer.Attribute  = Current.Request.Attribute;
    // Update the request length
    Current.Request.Length = Current.Request.Length - DRP.Current.DSD.Length;
         // Update some DRP fields
    DRP.DSD.count    = DRP.DSD.count - 1;
    DRP.TotalOffset  = DRP.TotalOffset + DRP.Current.DSD.Length;
    // Check if all DRP/CRP DSDs consumed
            if (DRP.NextDSDOffset == 'hFC ) {      // DSD list end   Call FetchCRP;
            // Fetch CRP @ 'hFC
         // Update DRP next CRP memory region fields
            DRP.NxtDSDCRPMemRegion  = CRP.NextMemregion; // Fetched CRP MemRegion
            DRP.NxtDSDCRPBlock      = CRP.NextBlock;     // Fetched CRP BlockID
            DRP.NextDSDOffset       = 12;                // set offset to first CRP DSD
            if (VNR == 0) { // First CRP fetched
            DRP.VNR = 1;
    }
    } else {   // Not a DSD list end
        DRP.NextDSDOffset = DRP.NextDSDOffset + 12; // Update the offset
        if (VNR == 0) { // Consuming DRP DSDs
        // Update Current DSD fields from DRP
        DRP.Current.DSD.Address = DRP.DSD.Address;
        DRP.Current.DSD.Length  = DRP.DSD.Length;
        } else {
        // Update Current DSD fields from CRP
        DRP.Current.DSD.Address = CRP.DSD.Address;
        DRP.Current.DSD.Length  = CRP.DSD.Length;
      }
  }
         } else { // Current.Request.Length < DRP.Current.DSD.Length
         // Generate Host Buffer Request [Figure 4]
         HostBuffer.Address    = DRP.Current.DSD.Address;
         HostBuffer.Length     = Current.Request.Length;
         HostBuffer.Attribute  = Current.Request.Attribute; // CMP FIFO rdata.pci_attr
         Current.Request.Length = 0;          // End of current request
         // Update DRP current DSD info
         DRP.TotalOffset         = DRP.TotalOffset + Current.Request.Length;
         DRP.Current.DSD.Address = DRP.Current.DSD.Address + Current.Request.Length;
         DRP.Current.DSD.Length  = DRP.Current.DSD.Length - Current.Request.Length;
         }
    }
    // Fetch CRP from MIM and place it in cache 210 (256 bytes)
    FetchCRP {
    MIM.MemRegion = DRP.NxtDSDCRPMemRegion; // MIM request CRP MemRegion
    MIM.BlockID   = DRP.NextDSDCRPBlock;    // MIM request CRP BlockID
}
```

The foregoing aspects have various advantages. A dedicated offload engine 146 manages caching; retrieval and receiving a request for processing an address list control block (ALCB) by a hardware based, ALCB offload engine of an adapter coupled to a computing device, where the ALCB is for sending information by the adapter to a processor of the computing device;

determining by the ALCB offload engine that the ALCB associated with the request is located at a cache of the ALCB offload engine that is managed by a cache controller of the ALCB offload engine;

forwarding the ALCB to an address computation module of the ALCB offload engine that uses the ALCB to compute an address of a memory location of the computing device for transferring the information to the processor of the computing device, where the ALCB stores the address of the memory location in an address list;

generating a direct memory access (DMA) request to retrieve the ALCB from an adapter memory location, when the ALCB is not located at the cache; and storing the ALCB at the cache, after the ALCB is received in response to the DMA request; wherein the ALCB stored at the cache is used for ALCB processing by the ALCB offload engine for another request received after the ALCB is stored at the cache; and wherein the ALCB offload engine offloads ALCB processing from a receive direct memory access (RxDMA) module of the adapter that transfers the information to the processor of the computing device.

2. The method of claim 1, wherein the cache controller uses a memory region identifier and a block identifier as an index to determine if the ALCB is stored at the cache.

3. The method of claim 1, wherein the ALCB offload engine uses a ternary content addressable memory (TCAM) that stores a tag for each cache entry with a valid bit indicating that a cache entry is valid, a dirty bit indicating that a cache entry is to be written to the adapter memory and a transit bit indicating that a cache entry is in use.

4. The method of claim 1, wherein when the cache does not have space for the ALCB retrieved in response to the DMA request, then the cache controller flushes a least recently used entry to the adapter memory to create space for the ALCB.

5. The method of claim 1, wherein the adapter is a host bus adapter configured to process input/output requests.

6. The method of claim 3, wherein the request for the ALCB is generated by processing logic of the adapter.

7. The method of claim 1, wherein the request is stored at a first in-first out memory device and retrieved by the cache controller for processing.

8. A non-transitory, machine readable storage medium having stored thereon instructions for performing a method, comprising machine executable code which when executed by at least one machine, causes the machine to:

receive a request for processing an address list control block (ALCB) by a hardware based, ALCB offload engine of an adapter coupled to a computing device, where the ALCB is for sending information by the adapter to a processor of the computing device;

determine by the ALCB offload engine that the ALCB associated with the request is located at a cache of the ALCB offload engine that is managed by a cache controller of the ALCB offload engine;

forward the ALCB to an address computation module of the ALCB offload engine that uses the ALCB to compute an address of a memory location of the computing device for transferring the information to the processor of the computing device, where the ALCB stores the address of the memory location in an address list;

generate a direct memory access (DMA) request to retrieve the ALCB from an adapter memory location, when the ALCB is not located at the cache; and store the ALCB at the cache, after the ALCB is received in response to the DMA request; wherein the ALCB stored at the cache is used for ALCB processing by the ALCB offload engine for another request received after the ALCB is stored at the cache; and wherein the ALCB offload engine offloads ALCB processing from a receive direct memory access (RxDMA) module of the adapter that transfers the information to the processor of the computing device.

9. The non-transitory, storage medium of claim 8, wherein the cache controller uses a memory region identifier and a block identifier as an index to determine if the ALCB is stored at the cache.

10. The non-transitory, storage medium of claim 8, wherein the ALCB offload engine uses a ternary content addressable memory (TCAM) that stores a tag for each cache entry with a valid bit indicating that a cache entry is valid, a dirty bit indicating that a cache entry is to be written to the adapter memory and a transit bit indicating that a cache entry is in use.

11. The non-transitory, storage medium of claim 8, wherein when the cache does not have space for the ALCB retrieved in response to the DMA request, then the cache controller flushes a least recently used entry to the adapter memory to create space for the ALCB.

12. The non-transitory, storage medium of claim 8, wherein the adapter is a host bus adapter configured to process input/output requests.

13. The non-transitory, storage medium of claim 12, wherein the request for the ALCB is generated by processing logic of the adapter.

14. The non-transitory, storage medium of claim 8, wherein the request is stored a first in-first out memory device and retrieved by the cache controller for processing.

15. A device coupled to a computing device, comprising:

processing logic for executing instructions out of a device memory and generating a request for processing an address list control block (ALCB) used for sending information to a processor of the computing device; and a hardware based ALCB offload engine having:

a cache controller that is configured to receive the request for processing the ALCB; determine that the ALCB is located at a cache of the ALCB offload engine managed by the cache controller;

forward the ALCB to an address computation module of the ALCB offload engine that uses the ALCB to compute an address of a memory location of the computing device, where the ALCB stores the address of the memory location in an address list;

generate a direct memory access (DMA) request to retrieve the ALCB from the device memory, when the ALCB is not located at the cache; and store the ALCB at the cache, after the ALCB is received in response to the DMA request; wherein the ALCB stored at the cache is used for ALCB processing by the ALCB offload engine for another request received after the ALCB is stored at the cache; and wherein the ALCB offload engine offloads ALCB processing from a receive direct memory access (RxDMA) module of the adapter that transfers the information to the processor of the computing device.

16. The device of claim 15, wherein the cache controller uses a memory region identifier and a block identifier as an index to determine if the ALCB is stored at the cache.

17. The device of claim 15, wherein the ALCB offload engine uses a ternary content addressable memory (TCAM) that stores a tag for each cache entry with a valid bit indicating that a cache entry is valid, a dirty bit indicating that a cache entry is to be written to the adapter memory and a transit bit indicating that a cache entry is in use.

18. The device of claim 15, wherein when the cache does not have space for the ALCB retrieved in response to the DMA request, then the cache controller flushes a least recently used entry to the adapter memory to create space for the ALCB.

19. The device of claim 15, wherein the adapter is a host bus adapter configured to process input/output requests.

20. The device of claim 15, wherein the request is a stored at a first in-first out memory device and retrieved by the cache controller for processing.

\* \* \* \* \*